(12) United States Patent
Riedl et al.

(10) Patent No.: US 12,475,348 B2
(45) Date of Patent: Nov. 18, 2025

(54) METHOD FOR PRODUCING A FILM FOR A CARD-SHAPED DATA CARRIER, FILM AND CARD-SHAPED DATA CARRIER

(71) Applicant: GIESECKE+DEVRIENT EPAYMENTS GMBH, Munich (DE)

(72) Inventors: Josef Riedl, Attenkirchen (DE); Peter Tarantino, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/842,167

(22) PCT Filed: Mar. 2, 2023

(86) PCT No.: PCT/EP2023/025097
§ 371 (c)(1),
(2) Date: Aug. 28, 2024

(87) PCT Pub. No.: WO2023/165738
PCT Pub. Date: Sep. 7, 2023

(65) Prior Publication Data
US 2025/0181878 A1   Jun. 5, 2025

(30) Foreign Application Priority Data

Mar. 2, 2022   (DE) .................... 10 2022 000 747.9

(51) Int. Cl.
*G06K 19/06* (2006.01)
*B29C 48/00* (2019.01)
(Continued)

(52) U.S. Cl.
CPC .... *G06K 19/07722* (2013.01); *B29C 48/0021* (2019.02); *B29C 48/08* (2019.02);
(Continued)

(58) Field of Classification Search
CPC ..... B29C 48/08; B29C 55/12; B29C 48/0018; B29C 2948/92704; B29C 48/914; B29C 48/0021; G06K 19/07722
See application file for complete search history.

(56) References Cited

U.S. PATENT DOCUMENTS 5,203,941 A  *  4/1993  Spain ........................ B44C 1/24
156/244.11
5,795,695 A  *  8/1998  Malhotra ........... G03G 15/6591
156/239

(Continued)

FOREIGN PATENT DOCUMENTS

DE    102009019378 A1    11/2010
DE    102018005308 A1    1/2020
(Continued)

OTHER PUBLICATIONS

German Search Report from corresponding German Patent Application No. DE102022000747.9, Sep. 27, 2022.
(Continued)

*Primary Examiner* — Daniel St. Cyr
(74) *Attorney, Agent, or Firm* — Workman Nydegger

(57) ABSTRACT

A method for producing a film for a card-shaped data carrier, includes the following steps: providing at least one first material in an extruder of an extrusion apparatus; heating the first material to form a melt; extruding the melt through a nozzle outlet gap of the extrusion apparatus; conveying the extruded melt on a roller arrangement that is adjacent to the nozzle outlet gap and includes at least one cooling roller; providing at least one transfer film; supplying the transfer film to the extruded melt on the cooling roller is so the security element contacts a surface of the extruded melt on the surface of the transfer film; transferring the security element from the surface of the transfer film onto the surface (Continued)

of the extruded melt; cooling the extruded melt comprising the security element to form the film.

15 Claims, 2 Drawing Sheets

(51) Int. Cl.
    *B29C 48/08*     (2019.01)
    *B29C 48/88*     (2019.01)
    *G06K 19/077*     (2006.01)
    *B29C 48/355*     (2019.01)
    *B29L 17/00*     (2006.01)

(52) U.S. Cl.
    CPC .......... *B29C 48/914* (2019.02); *B29C 48/355* (2019.02); *B29L 2017/00* (2013.01)

(56) References Cited

U.S. PATENT DOCUMENTS

| | | | |
|---|---|---|---|
| 5,985,079 A * | 11/1999 | Ellison | B32B 37/153 264/129 |
| 6,236,988 B1 * | 5/2001 | Aldred | G06F 16/284 707/999.102 |
| 6,254,712 B1 * | 7/2001 | Enlow | B29C 48/022 156/244.11 |
| 6,284,183 B1 * | 9/2001 | Roys | B32B 37/153 156/244.11 |
| 6,403,005 B1 * | 6/2002 | Mientus | B29C 48/21 264/173.1 |
| 2002/0114951 A1 * | 8/2002 | Horansky | B32B 27/32 264/173.13 |
| 2006/0011288 A1 | 1/2006 | Watanabe et al. | |

FOREIGN PATENT DOCUMENTS

| | | |
|---|---|---|
| EP | 3279005 A1 | 2/2018 |
| WO | 9640480 A1 | 12/1996 |

OTHER PUBLICATIONS

International Search Report from corresponding PCT Application No. PCT/EP2023/025097, Jun. 2, 2023.

* cited by examiner

METHOD FOR PRODUCING A FILM FOR A CARD-SHAPED DATA CARRIER, FILM AND CARD-SHAPED DATA CARRIER

BACKGROUND

The present invention relates to a method for producing a film for a card-shaped data carrier and to a film for a card-shaped data carrier and a card-shaped data carrier comprising the film.

A large number of card-shaped data carriers are known from the prior art, for example smart cards, chip cards, especially with RFID technology (radio-frequency identification), integrated circuit cards, dual-interface cards or identification cards. In particular, the use of smart cards, such as credit cards or payment cards, has become established for carrying out financial transactions. Card-shaped data carriers such as security documents, for example passport and ID documents, ID cards and the like are increasingly being used not just in public sectors, but also in in-house business operations.

The card-shaped data carrier typically has a card body having a module opening to accommodate a chip module or other electronic components for contact-based and/or contactless data communication. The card body is often formed of a plurality of films, the individual films being bonded together by means of a lamination using pressure and heat to form a film layer composite. On the surface of the card body there are preferably design films or transparent cover films, known as overlay films, that have security elements. Optical security elements on the card-shaped data carriers are known and are generally intended to boost protection against counterfeiting.

The films for the card body are typically formed as plastic films and can be produced by means of an extrusion process.

However, a disadvantage that has emerged is that certain security elements, especially optical security elements or specific design elements covering a large area, cannot be laminated to other film materials without the additional use of special adhesives. In other words, lamination necessitates the use of special additional adhesives, in order for example to bond a film having a security element to another film in the card body. A further disadvantage that has emerged is that the corresponding film layer composite is at least to some degree inadequately formed and the special adhesive means that foreign material must be introduced into the card structure in order to create bonding of the films. Moreover, materials for security elements are known, for example temperature-sensitive materials, that are not suitable for the use of an extrusion process for film production, which greatly limits the choice of materials for security elements. In particular, security elements covering a large area above a certain size can no longer be conveyed by an extrusion apparatus, since the security elements could either be destroyed in the extrusion apparatus or could clog the extrusion apparatus.

SUMMARY

The object of the present invention is to specify a method for producing a film for a card-shaped data carrier, especially for a smart card, with which the use of security elements for card-shaped data carriers can be improved. It is an additional object of the present invention to specify a corresponding film and a corresponding card-shaped data carrier.

Embodiments and developments of the invention are specified in the dependent claims and disclosed in relation to the description and the figures. Features and details described in connection with the method of the invention also apply in connection with the film of the invention and with the card-shaped data carrier of the invention, and vice versa in each case, so that mutual reference can always be made to the individual aspects of the invention with regard to the disclosure.

According to a first aspect of the invention, a method for producing a film for a card-shaped data carrier is provided, which comprises the following steps:

providing at least one first material in an extruder of an extrusion apparatus;

heating the first material to form a melt;

extruding the melt through a nozzle outlet gap of the extrusion apparatus;

conveying the extruded melt on a roller arrangement that is adjacent to the nozzle outlet gap and comprises at least one cooling roller;

providing at least one transfer film, wherein at least one transferable security element is arranged on a surface of the transfer film;

supplying the transfer film to the extruded melt on the cooling roller in such a way that the security element contacts a surface of the extruded melt on the surface of the transfer film;

transferring the security element from the surface of the transfer film onto the surface of the extruded melt;

cooling the extruded melt comprising the security element to form the film.

In the context of the application, card-shaped data bodies preferably include smart cards wherein the film can serve as an overlay film. However, it should be noted that the invention can be applied to a diversity of card types as required.

In the context of the application it is conceivable for co-extrusion to be used for the film being formed. For example, a first material can be provided for this purpose in a main extruder of the extrusion apparatus. A second material can also be provided in a secondary extruder of the extrusion apparatus. The first material can be heated to form a first melt and the second material can be heated to form a second melt. The first melt and the second melt can then be co-extruded through the nozzle outlet gap of the extrusion apparatus, as a result of which a multilayer melt can be formed. This extruded multilayer melt can be conveyed in analogous manner on a cooling roller of a roller arrangement adjacent to the nozzle outlet gap. In addition, the transfer film can be supplied to the extruded multilayer melt on the cooling roller in such a way that the security element contacts a surface of the extruded multilayer melt on the surface of the transfer film and the security element can be transferred from the surface of the transfer film onto the surface of the extruded multilayer melt. The extruded multilayer melt comprising the security element can then be cooled to form a multilayer film. The film thus formed can be used for a card body of the card-shaped data carrier and includes the security element.

With co-extrusion it is generally possible for a plurality of different materials to be conveyed through the same extrusion apparatus, in particular three or four or more materials. It is in addition generally conceivable that a plurality of materials is provided for the main extruder and a plurality of materials for the secondary extruder.

In the context of the application, it is for example possible for the first material to be provided to the extruder in the form of pellets, especially as plastic pellets. In the extruder, the first material can be heated/melted to form a melt. In other words, the first material is converted into a meltable state. The melt can then be extruded/forced out through the nozzle outlet gap. The nozzle outlet gap here constitutes a shaping opening. As a result of cooling, the melt is normally able to cool down/completely solidify within a certain time interval after exiting the nozzle outlet gap. Cooling can be achieved by conveying the extruded melt on the cooling roller, for example.

In the context of the application, a transfer film is provided, in particular separately from the first material and the extrusion apparatus, which can be supplied to the extruded melt. On the transfer film, at least one transferable security element is arranged on a surface of the transfer film. Preferably, a plurality or a large number of security elements are arranged on the surface of the transfer film. In the context of the application, the term "transferable" describes the state in which the security element can be detached from the surface of the transfer film and can be transferred to another component, for example the extruded melt. The security element is therefore after the transfer preferably attached to the extruded melt and no longer to the transfer film. In particular, the security element is after the transfer bonded to the extruded melt/arranged on a surface of the extruded melt. In other words, the film formed by the method of the invention includes the security element.

In particular, the transfer film is supplied to the extruded melt on the cooling roller and brought into contact with the extruded melt. It is preferable here that the security element contacts a surface of the extruded melt on the surface of the transfer film. As a result of the contact of the surfaces, the security element is able to be transferred from the transfer film to the extruded melt. After the transfer of the security element, the extruded melt including the security element is able to cool/completely solidify, thereby forming a film comprising the security element. This film comprising the security element can be used for a card body of a card-shaped data carrier.

In the context of the application, the roller arrangement may preferably comprise multiple rollers, which may be coupled or arranged side-by-side. In particular, one or more cooling rollers, feed rollers, conveying rollers or winding rollers may be provided. The number of rollers of the roller arrangement may be specifically adapted to the production of the film, in particular to the cooling process of the film.

The invention has the advantage that the security element can be applied directly and immediately to the extruded melt by means of the transfer film. Not only does this mean that the security element can advantageously be permanently bonded to the extruded melt/to the film being formed, it also means that no additional special adhesive or additional foreign material is needed when laminating the films to form a card body. Before the extruded melt has completely cooled/solidified after exiting the nozzle outlet gap, the extruded melt has a certain degree of tack, since it may still be in a meltable state. When, for example, the transfer film is supplied to the extruded melt and contact occurs between the surface of the transfer film and the surface of the extruded melt, the security element is able to be transferred from the transfer film to the extruded melt by virtue of the tack of the melt. In other words, upon contact of the extruded melt and the transfer film, the tack of the melt allows the security element to adhere to the extruded melt and thus remain on the surface of the extruded melt.

The invention also has the advantage that even large-area, coarse or temperature-sensitive security elements can be applied to the extruded melt. In other words, even security elements that are difficult to extrude or unextrudable can be transferred onto the extruded melt, since it is possible for any kind of security element to be supplied via the transfer film. This provides greater flexibility in the choice of materials, both for the melt to be extruded and thus the film to be produced, and for the security elements too.

Preferably, any thermoplastic materials can in principle be used for the first material for the melt to be extruded. Depending on the application, preference is given to using for the melt a material that is compatible with other film materials in the card body and that can be readily laminated and thus processed further. It is also preferably possible to use for the melt a material that is able to form a flexible and mechanically stable melt. It is also preferably possible to use for the melt a material that can be processed at low melting temperatures, for example at 100° C.

The sequence of the steps of the method of the invention is not necessarily restricted to the described sequence or fixed in time. For example, the providing of the transfer film can also precede the providing of the first material or the timing thereof may be varied.

In a preferred embodiment, it may be the case that the security element is transferred from the surface of the transfer film onto the surface of the extruded melt as a result of a contact pressure of the roller arrangement. A contact pressure can be achieved here in various ways. For example, a contact pressure of the transfer film onto the extruded melt can be achieved by the transfer film being pressed onto the extruded melt via a feed roller. More particularly, the feed roller and the cooling roller here exert pressure onto the transfer film being guided therebetween and onto the extruded melt. It is also possible to generate a contact pressure pneumatically, hydraulically or electrostatically, for example. As a result of the contact pressure, the transfer of the security element from the surface of the transfer film onto the surface of the extruded melt can advantageously be improved further. In addition to the above-described adhesion of the transferred security element to the extruded melt by virtue of the tack of the melt, this adhesion can be strengthened further by the contact pressure.

Preferably, it may be the case that the transfer film is supplied to the extruded melt on the cooling roller via a feed roller of the roller arrangement. This has the advantage that the transfer film can be supplied to the extruded melt in a directed and precise manner. In addition, the contact pressure described above can be advantageously generated through the use of a cooling roller and a feed roller, the extruded melt and the transfer film being guided between the cooling roller and the feed roller. As a result of the contact pressure, the transfer of the security element from the transfer film onto the extruded melt can be improved.

Alternatively or in addition, it may be the case that the transfer film is supplied to the extruded melt directly adjacent to the nozzle outlet gap. In other words, the roller arrangement for conveying the extruded melt and/or supplying the transfer film is arranged adjacently to the nozzle outlet gap. The arrangement of the roller arrangement directly at the nozzle outlet gap has the advantage that the extruded melt exiting the nozzle outlet gap has not yet cooled down significantly and can therefore still be in a sufficiently meltable state having sufficient tack. This can improve the transfer of the security element from the transfer film onto the extruded melt.

In a particularly preferred embodiment, it may be the case that the transfer film is supplied to the extruded melt while the extruded melt is at a temperature above its glass transition temperature. The glass transition temperature, or in other words the softening temperature, generally refers to the temperature at which a material, especially a plastic, exhibits the greatest change in deformability without the melting temperature being reached. This so-called glass transition therefore separates the brittle, energy-elastic region therebelow from the soft, entropy-elastic region/rubber-elastic region thereabove. In other words, a material having a glass transition temperature of 70° C. may have a rubber-elastic state at a higher temperature, for example 80° C., and a solid or solidified state at a lower temperature, for example 60° C. When the extruded melt is at a temperature above its glass transition temperature, the extruded melt is thus preferably in a meltable state and has tack. In this meltable state, the transfer of the security element from the transfer film onto the extruded melt can advantageously be improved.

Advantageously, it may be the case that the transfer film is removed from the formed film after the extruded melt comprising the security element has cooled. It is preferable that the transfer film is removed from the extruded melt comprising the security element only once the extruded melt has completely solidified/cooled and the film comprising the security element has thus formed. For example, the transfer film can be detached from the formed film, in particular via a feed roller of the roller arrangement, and be wound separately from the formed film.

Alternatively or in addition, it may be the case that the transfer film is stored together with the formed film after the extruded melt comprising the security element has cooled. For example, it may be the case that the transfer film together with the formed film, which after the transfer includes the security element, is conveyed via a feed roller and/or is wound via a winding roller. Depending on the particular application, the transfer film may be stored together with the formed film comprising the security element or separately from one another.

Preferably, it may be the case that a non-extrudable material, especially a glittery structure, paper, mélange fibers, metal elements or temperature-sensitive additives, is used for the security element. Advantageously, it is possible to use any material for the security element, for example also wood or shredded banknotes or metallic particles. It is thus preferable also to be able to use for the security element materials that are difficult to extrude or are unextrudable. This provides a general increase in flexibility in the choice of materials for the security element. The security element may in addition constitute an additional component of the card-shaped data carrier that improves protection against counterfeiting of the card-shaped data carrier. In general, an increased number of optically visible security elements, for example, ensures increased protection against counterfeiting, since the security element would have to be reproduced as an additional component or displayed exactly for a copy. The security element of the invention is thus able, firstly, to enhance the security function of the card-shaped data carrier and, secondly, to flexibly expand the design options and optics of the card-shaped data carrier.

In a particularly preferred embodiment, it may be the case that the transfer film is thermally stable at a temperature of at least 100° C. and at most 300° C., preferably 200° C. It is preferable here that the transfer film is designed to be thermally stable and may be made in particular from a temperature-resistant thermoplastic. Preferably, the transfer film can also be designed to be dimensionally stable. The thermally stable design of the transfer film has the advantage that the transfer film, upon contact with the extruded melt, does not deform and essentially retains its shape. This ensures inter alia that the security element on the transfer film, upon contact with the extruded melt, does not become deformed or damaged through deformation of the transfer film. On exiting the nozzle outlet gap, the extruded melt may be at a temperature in the region of the extrusion temperature and therefore be very hot. For example, the extrusion temperature of PETG (polyethylene terephthalate-glycol copolymer) can be approximately 230° C. PC (polycarbonate) has for example an extrusion temperature of approximately 300° C. It is therefore advantageous when the transfer film, which comes into contact with the extruded melt, is thermally stable in the region of the extrusion temperature of the material used for the melt.

Preferably, it may be the case that the material used for the transfer film is polyester, polyethylene naphthalate, polyether ether ketone (PEEK), polysulfone polymers, fluoropolymers, polyimide or polyamide-imide. Other thermally stable materials can however generally be used for the transfer film. Preferably, the material for the transfer film is selected such that it is thermally stable in the region of the extrusion temperature of the material for the melt. Consequently, the material for the transfer film is not limited to the examples mentioned.

Particularly preferably, it may be the case that the transfer film is formed by a biaxial stretching (biaxial orientation) process. Biaxial stretching preferably comprises stretching in the longitudinal and transverse direction. The stretching can here take place sequentially, i.e. first in the longitudinal and then in the transverse direction, or simultaneously in both directions at the same time. The stretching process makes it possible to improve especially the mechanical properties, for example tear resistance, and the thermal stability of transfer films, especially polymer transfer films. The improvement in thermal stability is due in particular to an increase in the crystallinity of the transfer film brought about by the stretching process.

Advantageously, it may be the case that a biaxially oriented polypropylene film (boPP), a biaxially oriented polyester film (boPET) or a biaxially oriented polybutylene terephthalate film (boPBT) is used for the transfer film. However, other materials can generally be used for the transfer film that are able to form a biaxially oriented/stretched transfer film.

Alternatively or in addition, it may be the case that at least one release layer is arranged between the transfer film and the security element to facilitate the transfer of the security element. In other words, the release layer can be regarded as a kind of backing layer or separating layer that is arranged between the security element and the transfer film. In particular, the release layer can facilitate the detachment of the security element and its transfer onto the extruded melt, since it can have only low adhesion to the transfer film.

According to a second aspect of the invention, a film for a card-shaped data carrier, especially a smart card, is provided, which is produced by a method according to the invention. Consequently, the film of the invention has the same features and advantages as have been elucidated with regard to the method of the invention.

According to a third aspect of the invention, a card-shaped data carrier, especially a smart card, is provided, which has a card body on which a film of the invention is arranged. Consequently, the card-shaped data carrier of the invention has the same features and advantages as have been elucidated with regard to the method of the invention and the film of the invention.

BRIEF DESCRIPTION OF THE DRAWINGS

The present invention is described hereinbelow with reference by way of example to the accompanying figures in the context of embodiments. It is self-evident that individual features of the embodiments may where technically feasible be freely combined with one another without departing from the scope of the present invention. Elements having the same function and mode of operation are in the figures labeled with the same reference symbols. In the figures below.

DETAILED DESCRIPTION OF VARIOUS EMBODIMENTS

Figure 1:
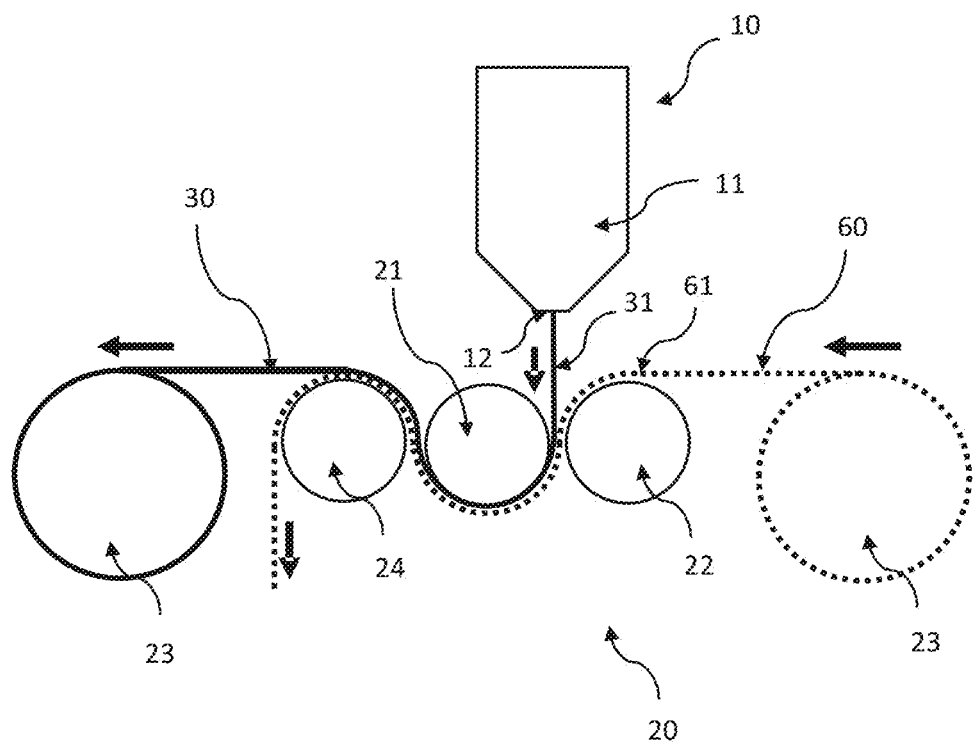
FIG. 1 shows a schematic view for a method of the invention for producing a film of the invention.

FIG. 1 shows a schematic view for a method of the invention for producing a film 40 of the invention. First, a first material can be provided in an extruder 11 of an extrusion apparatus 10. Preferably, the first material can be provided to the extruder 11 in the form of pellets, especially as plastic pellets. The first material is more particularly introduced into the extruder 11. The first material can then be heated/melted to form a melt 30. In other words, the first material is converted into a meltable state. The melt 30 can then be extruded/forced out through a nozzle outlet gap 12 of the extrusion apparatus 10. The nozzle outlet gap 12 here constitutes a shaping opening.

The extruded melt 30/melt 30 emerging from the nozzle outlet gap 12 is illustrated by way of example by the continuous line. The extruded melt 30 is then conveyed to the nozzle outlet gap 12, for example along the direction of the arrow.

As a result of cooling, the extruded melt 30 is normally able to cool down/completely solidify within a certain time interval after exiting the nozzle outlet gap 12. The completely solidified/cooled extruded melt 30 constitutes a formed film 40. More particularly, the extruded melt 30 cools down during conveyance of the extruded melt 30 on a roller arrangement 20. In other words, a film 40 of the extruded melt 30 is formed as a result of cooling during conveyance on the roller arrangement 20. For example, the extruded melt 30 is conveyed on a roller arrangement 20 adjacent to the nozzle outlet gap 12.

The roller arrangement 20 comprises for example several, in particular five, rollers, which can be coupled/arranged side-by-side. For example, a cooling roller 21, two winding rollers 23, a feed roller 22, and a conveying roller 24 are provided. The number of rollers of the roller arrangement 20 may be specifically adapted to the production of the film, in particular to the cooling process of the extruded melt for the film. Cooling can be achieved by conveying the extruded melt 30 on the cooling roller 21, for example. The cooling roller 21 is here preferably directly adjacent to the nozzle outlet gap 12. For example, the extruded melt 30 is conveyed via the cooling roller 21 and essentially completely cools/solidifies to form the film 40 while being conveyed on the cooling roller 21. After the cooling roller 21, the formed film 40 can be conveyed via the conveying roller 24 to the winding roller 23 and be wound on the winding roller 23.

In addition, a transfer film 60 is provided that can be supplied to the extruded melt 30. The transfer film 60 is illustrated by the dashed line. The transfer film 60 can be provided wound on a winding roller 23, for example. On the transfer film 60, at least one transferable (not shown) security element is arranged on a surface 61 of the transfer film 60. Preferably, a plurality or a large number of security elements are arranged on the surface 61 of the transfer film 60. Preferably, it may be the case that a non-extrudable material, especially a glittery structure, paper, mélange fibers, metal elements or temperature-sensitive additives, is used for the security element. In addition, it is for example the case that the transfer film 60 is thermally stable at a temperature of at least 100° C. and at most 300° C., preferably 200° C. It is preferable here that the transfer film 60 is designed to be thermally stable and may be made in particular from a temperature-resistant thermoplastic. Preferably, the transfer film 60 can also be designed to be dimensionally stable. For example, the transfer film 60 may also be formed by biaxial stretching.

In particular, the transfer film 60 is supplied to the extruded melt 30 on the cooling roller 21, thereby bringing it into contact with the extruded melt 30. For example, the transfer film 60 is here unwound from the winding roller 23 and supplied to the cooling roller 21 via the feed roller 22 in the direction of the arrow. In other words, the transfer film 60 is supplied to the extruded melt 30 on the cooling roller 21 via the feed roller 22. For example, the extruded melt 30 together with the contacting transfer film 60 is guided a section at a time between the cooling roller 21 and the feed roller 22. In other words, the feed roller 22 is able to press the transfer film 60 onto the extruded melt 30.

It is preferable here that the security element contacts a surface 31 of the extruded melt 30 on the surface 61 of the transfer film 60. As a result of the contact of the surfaces 31 and 61, the security element can be transferred from the transfer film 60 to the extruded melt 30. In other words, the security element is transferred from the surface 61 of the transfer film 60 onto the surface 31 of the extruded melt 30.

Before the extruded melt 30 has completely cooled/solidified after exiting the nozzle outlet gap 12, the extruded melt 30 has a certain degree of tack, since it may still be in a meltable state. When, for example, the transfer film 60 is supplied to the extruded melt 30 and contact occurs between the surface 61 of the transfer film 60 and the surface 31 of the extruded melt 30, the security element is already able to be transferred from the transfer film 60 to the extruded melt 30 by virtue of the tack of the melt 30.

In addition, a contact pressure is achieved by the arrangement of the extruded melt 30 and the transfer film 60 between the cooling roller 21 and the feed roller 22. More particularly, the feed roller 22 and the cooling roller 21 here exert pressure onto the transfer film 60 being guided therebetween and onto the extruded melt 30. As a result of the contact pressure, the transfer of the security element from the surface 61 of the transfer film 60 onto the surface 31 of the extruded melt 30 can advantageously be improved further. In addition to the above-described adhesion of the transferred security element to the extruded melt 30 by virtue of the tack of the melt 30, this adhesion can be strengthened further by the contact pressure generated by the cooling roller 21 and the feed roller 22.

It is preferable that the transfer film 60 is supplied to the extruded melt 30 while the extruded melt 30 is at a temperature above its glass transition temperature. When the extruded melt 30 is at a temperature above its glass transition temperature, the extruded melt 30 is thus preferably in a meltable state and has the described tack.

The security element is after the transfer preferably attached to the extruded melt 30 and no longer to the transfer film 60. In particular, the security element is after the transfer bonded to the extruded melt 30/arranged on a surface of the extruded melt 30. After the transfer of the security element, the extruded melt 30 including the security element is able to cool/completely solidify, thereby forming the film 40 comprising the security element. In other words, the film 40 formed by the method of the invention includes the security element. This film 40 comprising the security element can be used for a card body of a card-shaped data carrier, for example a smart card.

For example, it may be the case that the transfer film 60 is removed from the formed film 40 after the extruded melt 30 comprising the security element has cooled. It is preferable that the transfer film 60 is removed from the extruded melt 30 comprising the security element only once the extruded melt 30 has completely solidified/cooled and the film 40 comprising the security element has thus formed. For example, the transfer film 60 can be detached from the formed film 40, in particular via the conveying roller 24 of the roller arrangement 20 in the direction of the arrow, and be wound separately from the formed film 40.

Advantageously, it is possible for the security element to be applied directly and immediately to the extruded melt 30 by means of the transfer film 60. Not only does this mean that the security element can advantageously be permanently bonded to the extruded melt 30/to the film 40 being formed, it also means that no additional special adhesive or additional foreign material is needed when laminating the films to form a card body. Further advantageously, it is possible for even large-area, coarse or temperature-sensitive security elements to be applied to the extruded melt 30. In other words, even security elements that are difficult to extrude or unextrudable can be transferred onto the extruded melt 30, since any kind of security element can be supplied via the transfer film 60. This provides greater flexibility in the choice of materials, both for the melt 30 to be extruded and thus the film 40 to be produced, and for the security elements too.

Figure 2:
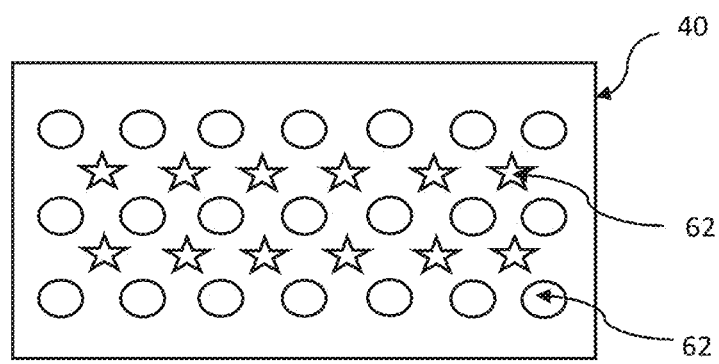
FIG. 2 shows a schematic view of a film according to one embodiment of the invention.

FIG. 2 shows a schematic view of a film 40 according to one embodiment of the invention. The film 40 is for example produced by the method according to FIG. 1. The film 40 has on its surface 41 a plurality of security elements 62 that have been transferred to the film 40 from the transfer film 60. For the sake of clarity, only two security elements 62 have been given reference symbols. The security elements 62 are circular and star-shaped in form, by way of example. It is generally possible to use any geometric shapes for the security elements 62, especially also complex geometric shapes. In particular, even security elements 62 that are difficult to extrude or unextrudable can be transferred onto the film 40, since any kind of security element 62 can be supplied via the transfer film 60. This provides greater flexibility in the choice of materials, both for the melt to be extruded and thus the film 40 to be produced, and for the security elements 62 too.

Figure 3:
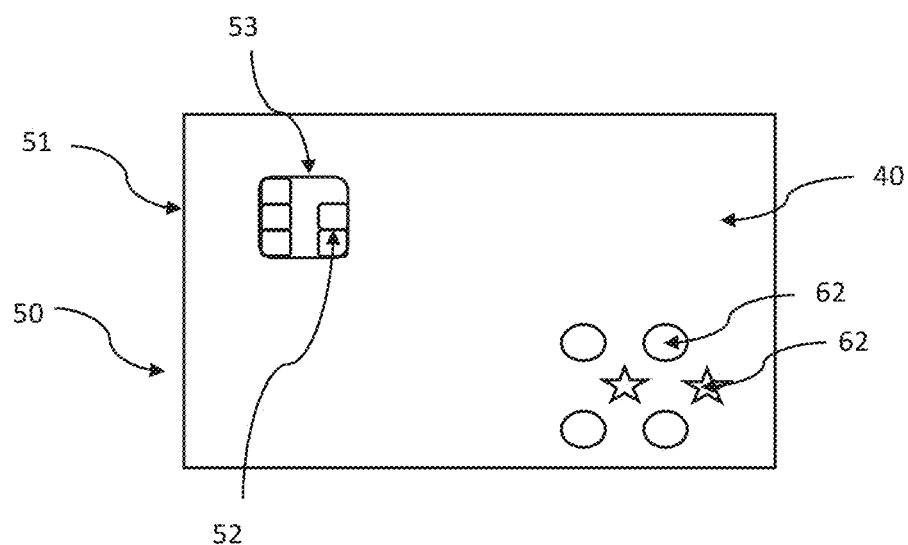
FIG. 3 shows a schematic view of a card-shaped data carrier according to one embodiment of the invention.

FIG. 3 shows a schematic view of a card-shaped data carrier 50, for example a smart card, according to one embodiment of the invention. The card-shaped data carrier 50 comprises an electronic chip module 52 and a card body 51 having an arrangement area 53 for accommodating the chip module 52. The chip module 52 is arranged in the arrangement area 53 of the card body 51. For example, the arrangement area 53 is formed as a recess or module opening, especially a milled cavity, in the card body 51, wherein the chip module 52 in the module opening may for example be bonded to the card body 51 by means of an adhesive, thereby allowing it to be stored in a protected manner.

The chip module 52 has a chip (not shown) and a contact structure 52*a*. This allows contact-based data transfer between the smart card and a reader. In particular, the chip is here preferably connected by wires to the contacts of the contact structure 52*a*, the contacts being defined by international standards. It is however possible to provide further components for the chip module 52, for example a capacitor or an antenna (in the form of a coil) for capacitive or inductive contactless data transmission. More particularly, the card-shaped data carrier 50 may also have other components not shown, such as a magnetic strip or a hologram.

The card-shaped data carrier 50 is for example formed from a plurality of different materials. In this case, the card body 51 is preferably formed from a plurality of stacked plastic films. The individual films may be bonded together by means of a lamination using pressure and heat to form a film layer composite.

Arranged on the surface of the card body is for example a film 40 that is produced by a method according to FIG. 1 and formed in accordance with FIG. 2. In other words, the card-shaped data carrier 50 has a card body 51 on which is arranged a film 40 that is produced by a method according to FIG. 1. Unlike in FIG. 2, on the film 40 according to FIG. 3 there is a reduced number of security elements 62, for example six security elements 62. The number of security elements 62 can generally be variable and be flexibly adapted to the particular application for the card-shaped data carrier 50.

The invention claimed is:

1. A method for producing a film for a card-shaped data carrier, comprising the following steps:
   providing at least one first material in an extruder of an extrusion apparatus;
   heating the first material to form a melt;
   extruding the melt through a nozzle outlet gap of the extrusion apparatus;
   conveying the extruded melt on a roller arrangement that is adjacent to the nozzle outlet gap and comprises at least one cooling roller;
   providing at least one transfer film, wherein at least one transferable security element is arranged on a surface of the transfer film;
   supplying the transfer film to the extruded melt on the cooling roller in such a way that the security element contacts a surface of the extruded melt on the surface of the transfer film;
   transferring the security element from the surface of the transfer film onto the surface of the extruded melt;
   cooling the extruded melt comprising the security element to form the film.

2. The method according to claim 1, wherein the security element is transferred from the surface of the transfer film onto the surface of the extruded melt as a result of a contact pressure of the roller arrangement.

3. The method according to claim 1, wherein the transfer film is supplied to the extruded melt on the cooling roller via a feed roller of the roller arrangement.

4. The method according to claim 1, wherein the transfer film is supplied to the extruded melt directly adjacently to the nozzle outlet gap.

5. The method according to claim 1, wherein the transfer film is supplied to the extruded melt while the extruded melt is at a temperature above its glass transition temperature.

6. The method according to claim 1, wherein the transfer film is removed from the formed film after the extruded melt comprising the security element has cooled.

7. The method according to claim 1, wherein the transfer film is stored together with the formed film after the extruded melt comprising the security element has cooled.

8. The method according to claim 1, wherein a non-extrudable material, especially a glittery structure, paper, mélange fibers, metal elements or temperature-sensitive additives, is used for the security element.

9. The method according to claim 1, wherein the transfer film is thermally stable at a temperature of at least 100° C.

10. The method according to claim 1, wherein the material used for the transfer film is polyester, polyethylene naphthalate, polyether ether ketone (PEEK), polysulfone polymers, fluoropolymers, polyimide or polyamide-imide.

11. The method according to claim 1, wherein the transfer film is formed by a biaxial stretching process.

12. The method according to claim 11, wherein a biaxially oriented polypropylene film (boPP), a biaxially oriented polyester film (boPET) or a biaxially oriented polybutylene terephthalate film (boPBT) is used for the transfer film.

13. The method according to claim 1, wherein at least one release layer is arranged between the transfer film and the security element to facilitate the transfer of the security element.

14. A film for a card-shaped data carrier, said film comprising:
  a melt of at least one first material provided and heated in an extruder of an extrusion apparatus and subsequently conveyed on a roller arrangement having at least one cooling roller;
  a transfer film arranged to be supplied to the extruded melt on the at least one cooling roller in such a way that a security element contacts a surface of the extruded melt on the surface of the transfer film; and
  the security element being arranged on the surface of the transfer film and transferrable from the surface of the transfer film onto the surface of the extruded melt.

15. A card-shaped data carrier comprising a card body and a film is arranged on the card body;
  wherein the film is formed by:
  a melt of at least one first material provided and heated in an extruder of an extrusion apparatus and subsequently conveyed on a roller arrangement having at least one cooling roller;
  a transfer film arranged to be supplied to the extruded melt on the at least one cooling roller in such a way that the security element contacts a surface of the extruded melt on the surface of the transfer film; and
  the security element being arranged on the surface of the transfer film and transferrable from the surface of the transfer film onto the surface of the extruded melt.

* * * * *